Jan. 26, 1971  F. UCKO  3,558,312
PROCESS FOR FABRICATING MULTIPLE IMAGE PHOTOGRAPHIC MASTERS
Filed March 14, 1967
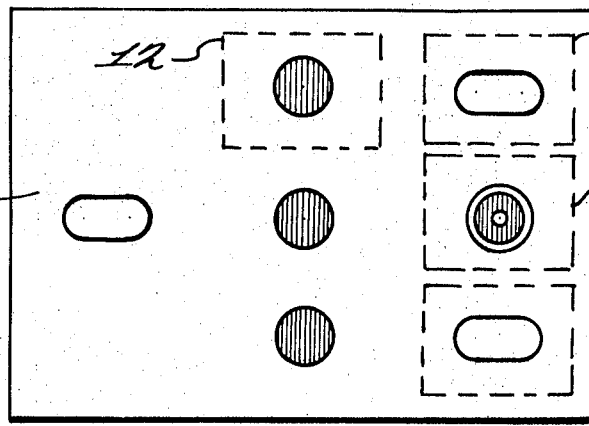
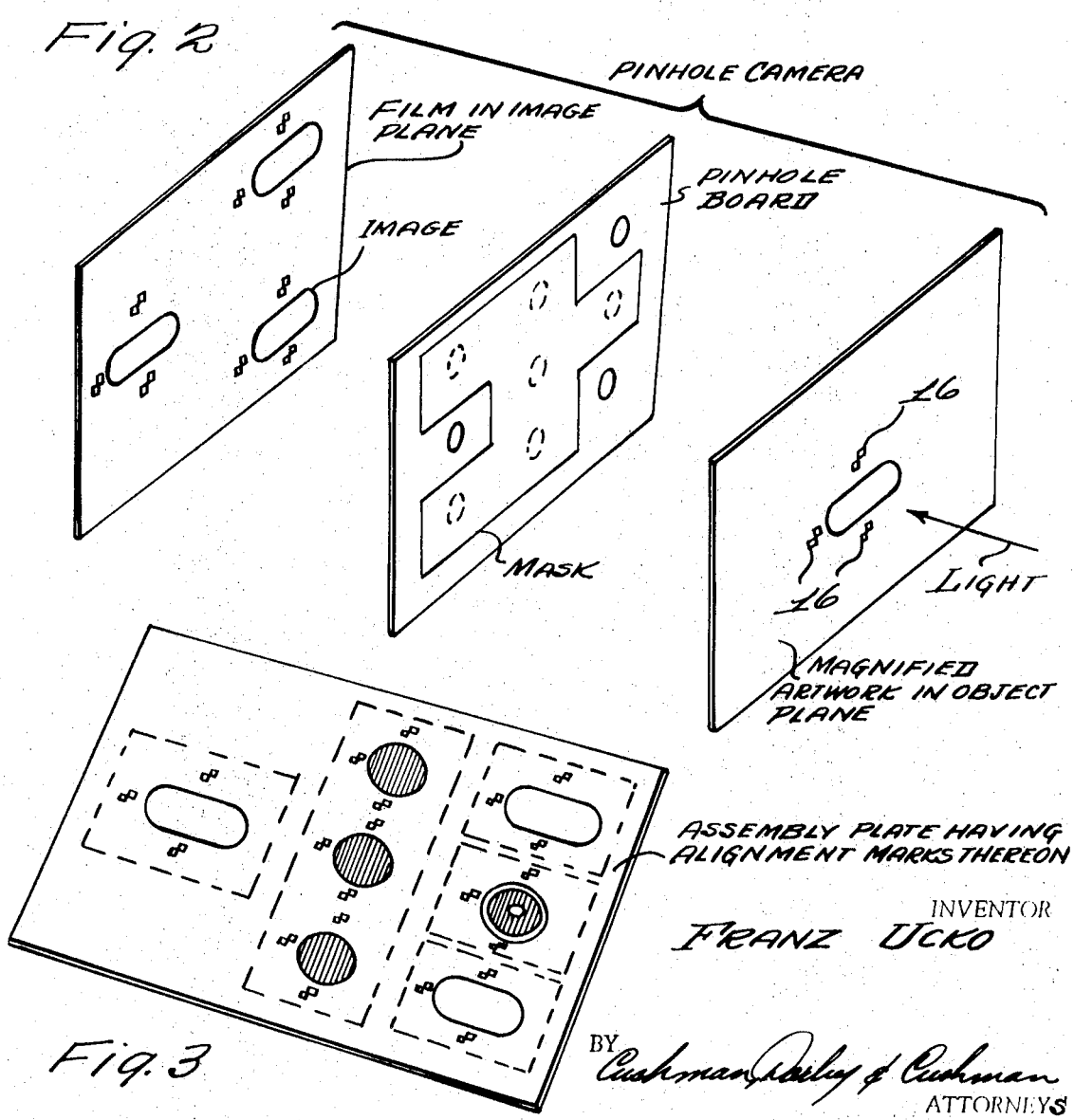
INVENTOR
FRANZ UCKO
BY
ATTORNEYS 3,558,312
PROCESS FOR FABRICATING MULTIPLE IMAGE PHOTOGRAPHIC MASTERS
Franz Ucko, St. Paul, Minn., assignor to Control Data Corporation, Minneapolis, Minn., a corporation of Minnesota
Filed Mar. 14, 1967, Ser. No. 623,074
Int. Cl. G03c 5/04
U.S. Cl. 96—41
1 Claim

ABSTRACT OF THE DISCLOSURE

A process for producing photographic masters of a design having a plurality of basic geometrical patterns which may occur a number of times. A basic pattern is prepared as magnified artwork forming the object of a pinhole camera. The pinhole board of the camera is selectively covered and multiple images of the object are produced at reduced size at the photosensitive image plane. These steps are repeated for each basic pattern to produce a photographic plate having multiple images of several basic patterns thereon.

---

The present invention pertains to the field of photomechanics and is specifically directed to an improved process for fabricating photographic masters of a multiple image design. Utility for such a process is found, for example, in the art of electronics.

In the design of electronic arrangements such as semiconductor devices, printed circuits, core nest configurations and the like, arrays of identical patterns are utilized. These patterns involve such small and precise dimensions that photographic and etching techniques are appropriate to faithfully produce same.

In the past, the multiple images were produced photographically by utilizing a so-called step-and-repeat camera. However, such a camera must be carefully employed to avoid image blurring, misalignment of the images, etc. Consequently, the use of this camera is a tedious and expensive process for preparing an accurate multiple image photograph.

To overcome the deficiencies of the step-and-repeat camera, attention has been turned to the classic pinhole camera. The pinhole camera is capable of producing sharp images when properly used with modern photographic materials. One type of modern material is an orthochromatic emulsion. Using an orthochromatic emulsion, the images formed are essentially free from distortion and the line acutance of an image is determined by the emulsion. By its very nature, when light is directed from an object through the array of pinholes, a multiple image is produced. This is explained in the article entitled "Pinhole Technique for Integrated Circuits Mask Fabrication" by I. Barowsky & L. G. Bruestle, as published in Reproduction Methods for Business and Industry in the December 1964 issue.

The present invention is concerned with an improved process for fabricating multiple image photographic masters utilizing a pinhole camera. The principal deficiency of known systems using such cameras is that multiple images of only a single basic geometric pattern and identical center dimensions or spacings are produced on each photographic plate. Therefore, in order to produce a final design having several basic patterns at any number of different center dimensions or spacings, it is necessary to properly align a plurality of such plates. Not only is this process time consuming, but more importantly, it is subject to inaccuracies.

It is therefore an object of this invention to provide a method for producing multiple images of a plurality of basic geometric patterns on a single photographic plate.

Another object of the invention is to provide an arrangement whereby a plurality of multiple image patterns can be directly produced in proper alignment on a single photographic plate which is the image plane of a pinhole camera.

The foregoing objects are achieved by producing separate magnified artworks conforming in configuration to each basic geometric pattern of the design to be produced on the photographic master. A piece of artwork for a single basic pattern is positioned in the object plane of a pinhole camera. An array of holes in the pinhole board is selected so as to produce the desired number of multiple images of this basic pattern, the spacing of the holes selected also being chosen so as to insure that the images are correctly separated. Photographic film at the image plane of the camera is the exposed to the images. The foregoing steps are repeated for each of the pieces of artwork. Of course, different pinholes are selected for each pattern, this being accomplished by simple masking of the pinhole board.

Further objects and the entire scope of the invention will become more fully apparent when considered in light of the following detailed description of illustrative embodiments of the invention and from the appended claim.

The illustrative embodiments may be best understood by reference to the accompanying drawings, wherein:

FIG. 1 is a diagrammatic illustration of a blueprint of a simple electronic circuit which is to be produced in an exact size on a photographic master;

FIG. 2 is a diagrammatic illustration of a basic pinhole camera for producing multiple images on a photographic film; and FIG. 3 is a diagrammatic illustration of an arrangement by which multiple images of a plurality of basic geometric patterns may be assembled so as to be recorded on a photographic master.

Referring now to the drawings, the invention will be described in detail. FIG. 1 depicts a blueprint of an electronic circuit, the blueprint illustrating, in greatly enlarged scale, a plurality of basic geometric patterns which make up the circuit design. For the purpose of describing the invention, an extremely simple circuit arrangement is shown on the blueprint. Such a circuit is not intended to illustrate a practical circuit, but instead is for the purpose of portraying a group of basic patterns which are capable of being produced to an exact size on a photographic master in accordance with the present invention.

The blueprint illustrates three basic geometric patterns. These are located within the blocks defined by the respective dash lines 10, 12 and 14. Of course, these dash lines do not form a part of the circuit design. Rather, they have been added to FIG. 1 simply to facilitate the description of the invention.

Having defined the basic geometric patterns, the process for producing on a photographic master a nearly dimensionally exact representation of the circuit depicted on the blueprint will now be described. The first step is to prepare a separate exactly dimensioned, magnified piece of artwork for each basic geometric pattern. The artwork is performed by a commercially available coordinate layout machine on a light filtering material, such as Rubylith. The artwork is accomplished at an enlargement which is typically in the order of 20× or 40× the dimensions finally desired on the photographic master.

The artwork for one basic geometric pattern is then positioned in the object plane of a pinhole camera. This camera is illustrated in FIG. 2. A photographic film or plate is located at the image plane of the camera. A pinhole board is interposed between the object and image planes. Pinhole boards having many forms of pinhole arrays are commercially available, but special arrays can be fabricated utilizing conventional techniques. Based on the desired between-center dimensions of separate images of a basic geometry pattern, an appropriate pinhole board is chosen.

The pinhole board, according to the present invention, may allow only one basic spacing, a multiple of this basic spacing, or provide a plurality of different spacings. A pinhole board having all equally spaced holes will yield separate images which are spaced apart by a certain minimum distance or a multiple of that minimum distance. A pinhole board may be constructed with several areas of different spacings of pinholes to allow several different spacings of the separate images on the photographic plate.

Although in usual practice pinhole cameras employ a great number of pinholes, for convenience of illustration the array illustrated in FIG. 2 has been extremely simplified. To provide a desired reduction in the image size, a particular location of the pinhole board between the object and image planes is selected according to the previously mentioned article.

Since the basic geometric pattern in the object plane of the camera is to be produced in multiple images at particular locations, the pinhole board is selectively masked so that multiple images having specific positional relationship with respect to one another will fall on the film. By directing light through the artwork of filter material toward the pinhole board, the photographic film at the camera's image plane is exposed to produce multiple images in the desired positions.

The foregoing steps are repeated for each piece of artwork representing the remaining basic geometric patterns. As a result, a single photographic plate is produced which has thereon properly dimensioned multiple images of a plurality of basic geometric patterns.

From the above description, it will be appreciated that if the pinhole spacing and location are properly chosen for each basic geometric pattern, it is possible to produce directly the final photographic master of the overall design by the pinhole camera. All that is required is the knowledge as to where on the pinhole board the pinholes should be provided. This information can be readily obtained by programming a computer to operate on information obtained from the circuit blueprint. Utilizing this computed positional information, the pinhole board for the particular circuit design can be fabricated by conventional techniques. The pinhole board will either have all pinholes equally spaced if the center dimensions or spacings of the geometric patterns desired on the final photographic master are integral multiples of a basic dimension or spacing, or the pinhole board will have areas of pinholes having different spacing corresponding to the different center dimensions or spacings of the corresponding geometric patterns desired on the final photographic master.

An alternate technique may be used when the size of the photographic master will exceed the capability of the photographic equipment available. Additional steps are necessary to produce this photographic master. First the film at the image plane of the camera must be developed and a film contact print made. The print is then cut into groups of multiple images of each basic geometric pattern. The groups are then assembled on an assembly plate as illustrated in FIG. 3. The dash lines indicate typical groups into which the print from the camera film might be cut in carrying out the process utilizing the design shown in FIG. 1.

In assembling the image groups, the critical factor is proper alignment of the print portions with the assembly plate. Alignment is achieved, when this process is employed, by providing the original artwork for each basic geometry with alignment center marks. These marks are generally illustrated at 16 in FIG. 2. Through the photographic process, the alignment marks are contained on the cut print groups. The assembly plate typically is provided with a plastic coating which is scribed with center lines in accordance with the circuit blueprint, the scribing being performed at magnification compatible with that of the prints obtained from the camera film. The cut print groups are positively aligned with respect to the assembly plate by appropriate matching of the center lines found on the plate and the center mark on the cut prints. A simple contact print from this assembly is then made. Appropriate reduction in size is made onto an unexposed photo plate to produce a master photographic plate having the overall design and dimensions as originally presented in the circuit blueprint. From this master plate, any number of sub-masters can be produced.

Utilizing the photographic master, actual printed circuitry can be fabricated utilizing conventional photoresist techniques.

Thus, a positionally accurate photographic master may be made directly from the pinhole camera by changing the magnified artwork in the object plane and selectively masking the pinhole boards to conform to the desired number and location of the artwork on the photographic master, or a photographic master may be assembled from image groups which are created by use of a selectively masked pinhole board. When the image groups must be assembled, using the technique of the pinhole board provides accurate intragroup dimensions; so only the intergroup dimensions need be set by hand. This is illustrated in FIG. 3.

The above-described embodiments are illustrative of preferred embodiments of the invention but are not intended to limit the possibilities for producing multiple images of a plurality of basic geometric patterns on a single photographic plate. The invention has been described as particularly applicable to the field of electronics, but it is apparent that the invention is also useful in other arts in which it is desirable to prepare a photographic master of multiple image designs. It will also be apparent that certain modifications of the disclosed arrangement may be made within the spirit of the invention as defined by the appended claim.

What is claimed is:

1. A process for fabricating multiple image photographs from a plurality of geometric patterns, comprising the steps of:
    (a) preparing a magnified piece of artwork conforming in configuration to one of said geometric patterns and including alignment marks thereon;
    (b) positioning said piece in the object plane of a pinhole camera;
    (c) selectively masking a pinhole board of said camera leaving unmasked a predetermined number of pinholes in said board;
    (d) placing a photographic film at the image plane of said camera;
    (e) directing light through said piece toward and through the unmasked pinholes to expose said film with a number of images dependent on the arrangement of the unmasked pinholes;
    (f) repeating steps a, b, c, and e for each of the remaining geometric patterns with different selective masking being used for each pattern;
    (g) preparing a contact print from said exposed film;
    (h) cutting said print into groups of multiple images, each of said groups including the photographically recorded alignment marks from said artwork pieces;
    (i) positioning the cut print groups on an assembly plate provided with alignment marks at the same reduction as said print, the alignment marks of said print being located in correlation with those of said plate; and
    (j) photographically reproducing the aligned print groups on a single photographic plate.

(References on following page)

References Cited

UNITED STATES PATENTS

| | | | |
|---|---|---|---|
| 703,849 | 7/1902 | Szcepanik | 96—45 |
| 1,793,698 | 2/1931 | Jones | 95—18UX |
| 3,288,045 | 11/1966 | Harding | 95—18 |
| 3,452,657 | 7/1969 | Cox | 95—11 |
| 703,851 | 7/1902 | Szcepanik | 96—45 |

OTHER REFERENCES

Artwork for Photofabrication, pub. in The Kodak Compass, No. 2, 1963, p. 8, register made of record.

Rudge, W. E., Making Photographic Masks and Artwork, IBM Tech. Disclosure Bulletin, vol. 6, No. 7, December 1963, pp. 92 to 94.

DAVID KLEIN, Primary Examiner